March 23, 1926.

L. L. CASTETTER

CHIROPRACTIC TABLE

Filed May 14, 1923

1,577,785

10 Sheets-Sheet 1

INVENTOR
LUTHER L. CASTETTER
BY
Owen H. Spencer
HIS ATTORNEY

March 23, 1926.

L. L. CASTETTER

CHIROPRACTIC TABLE

Filed May 14, 1923 — 10 Sheets-Sheet 3

1,577,785

INVENTOR
LUTHER L. CASTETTER
BY
Owen H. Spencer
HIS ATTORNEY

March 23, 1926. 1,577,785
L. L. CASTETTER
CHIROPRACTIC TABLE
Filed May 14, 1923 10 Sheets-Sheet 9

INVENTOR
LUTHER L. CASTETTER
BY Owen H Spencer
HIS ATTORNEY

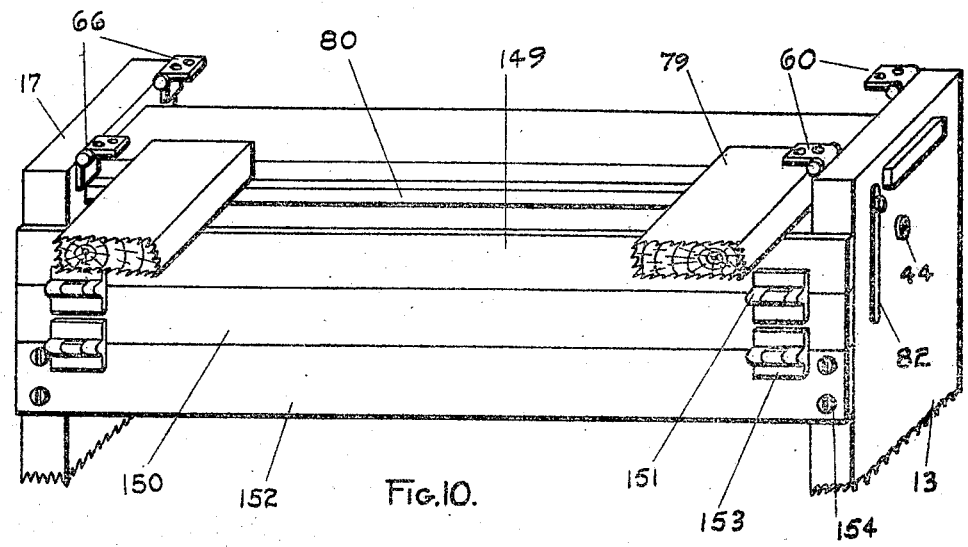
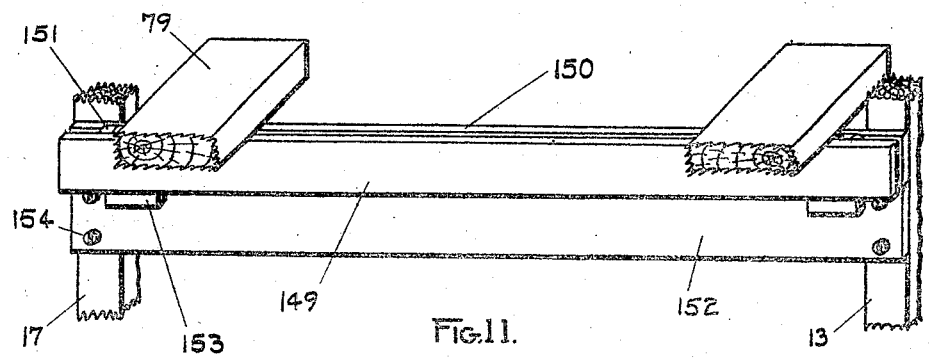
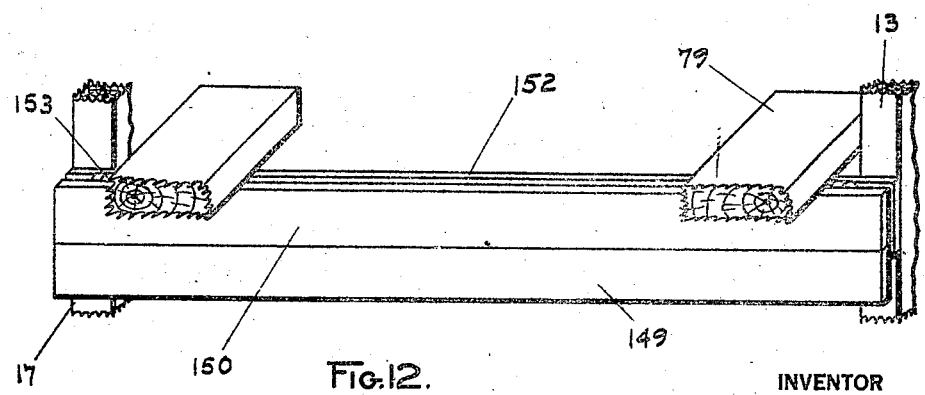

Patented Mar. 23, 1926.

1,577,785

UNITED STATES PATENT OFFICE.

LUTHER L. CASTETTER, OF INDIANAPOLIS, INDIANA.

CHIROPRACTIC TABLE.

Application filed May 14, 1923. Serial No. 638,929.

*To all whom it may concern:*

Be it known that I, LUTHER L. CASTETTER, a citizen of the United States, residing at Indianapolis, in the county of Marion and State of Indiana, have invented certain new and useful Improvements in Chiropractic Tables, of which the following is a specification.

My invention relates to chiropractic adjusting tables having adjustable cushion means and cushion means adapted to yield in response to certain manual thrust movements.

An object of my invention is to provide a chiropractic table with new and useful adjusting means and yielding means.

The primary object of my invention is to provide a chiropractic adjusting table adaptable to a variety of chiropractic requirements, simple in construction, and convenient to operate.

It is also an object of my invention to provide a chiropractic adjusting table of neat appearance, the greater part of the mechanism of which is concealed from normal observation.

It is also an object of my invention to provide a chiropractic table having supporting base means and legs cooperatable therewith adapted to be folded as desired whereby the working height of said table may be varied.

Figure 1:
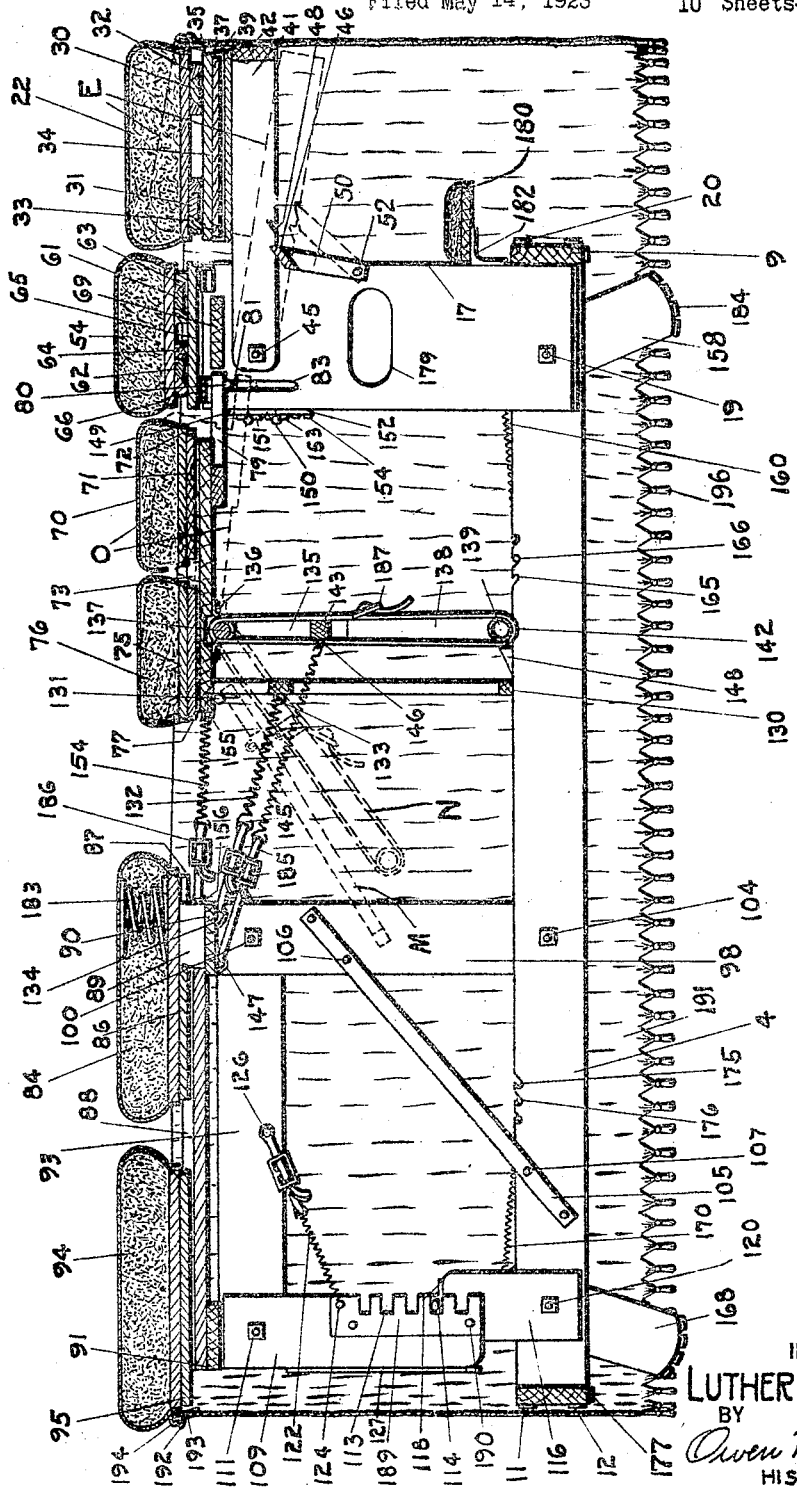
Figure 2:
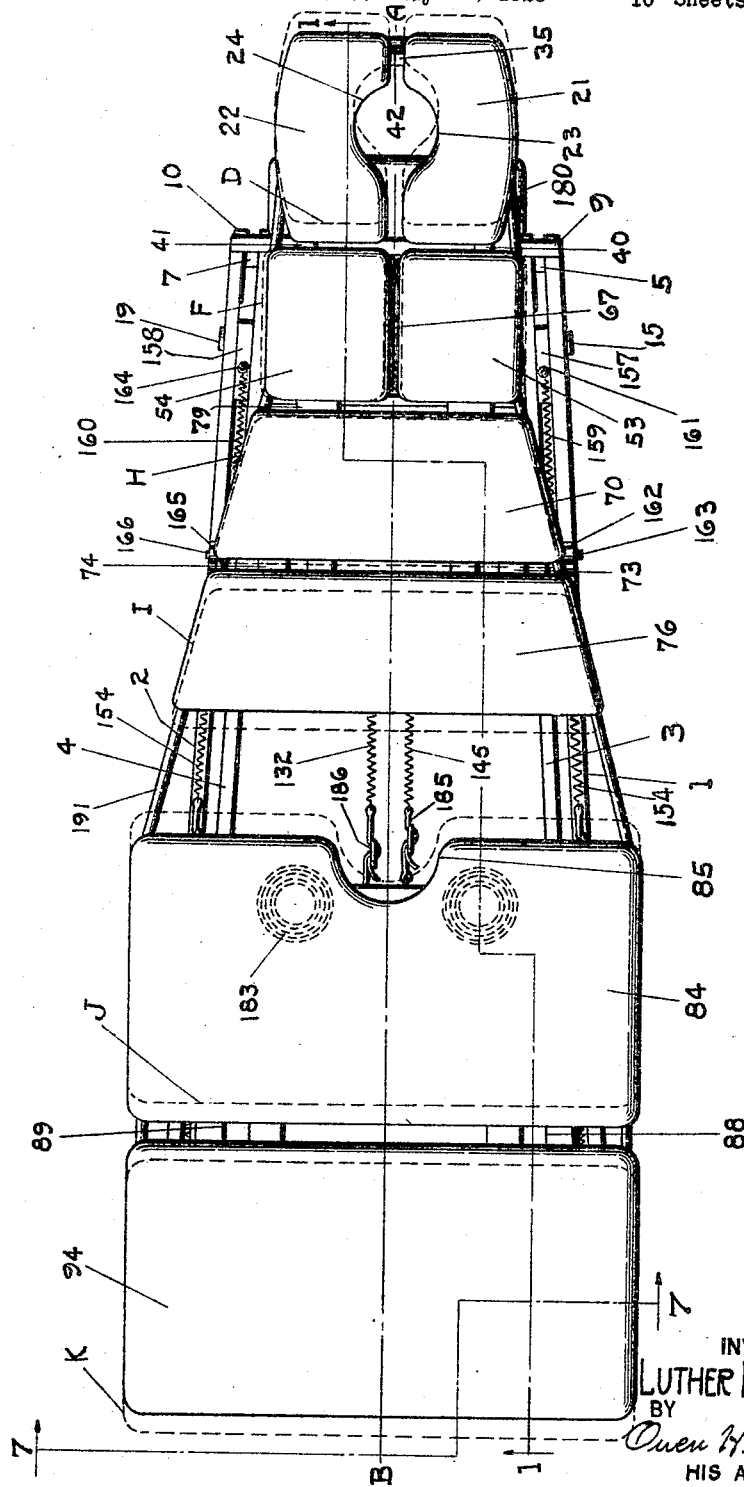
Figure 3:
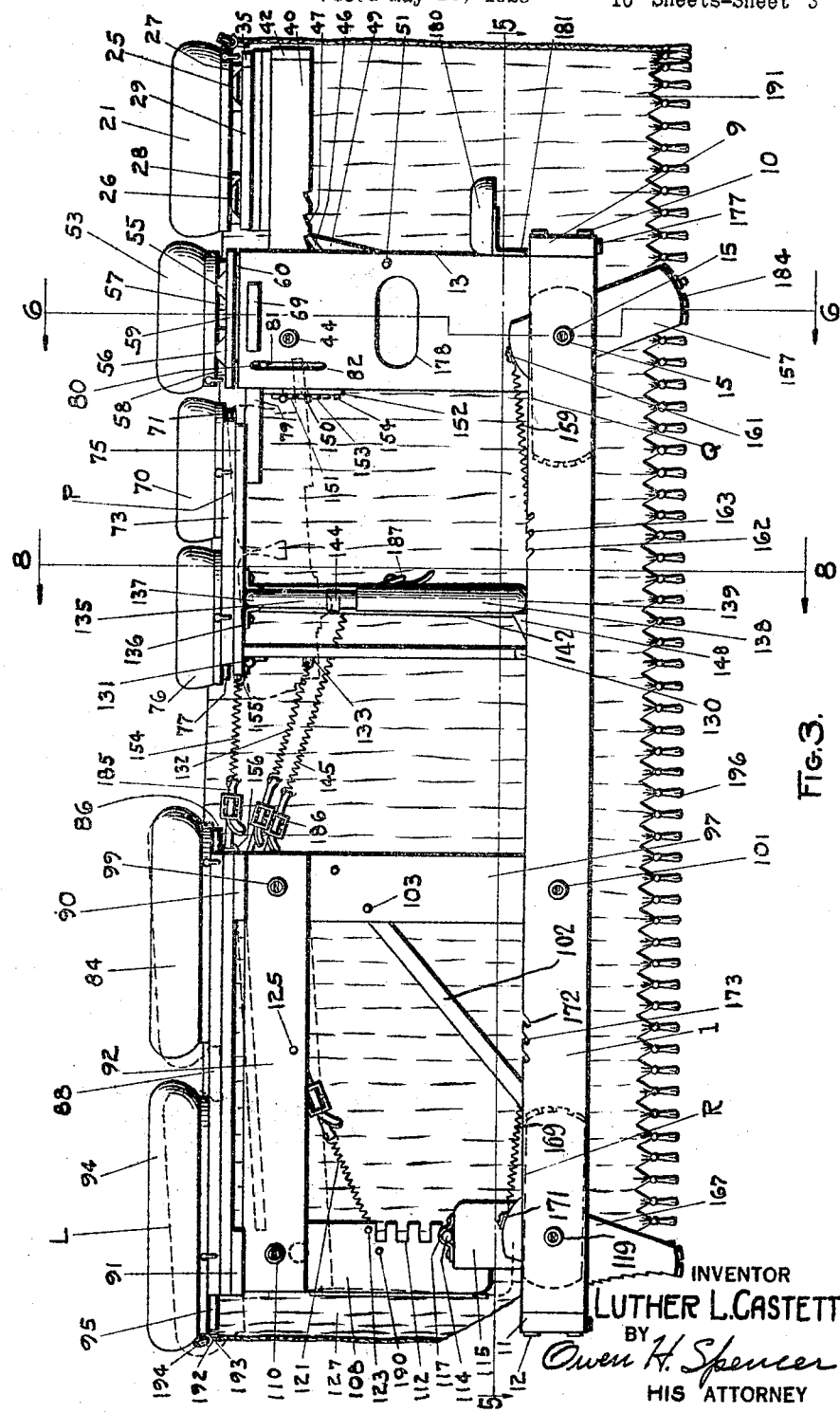
Figure 4:
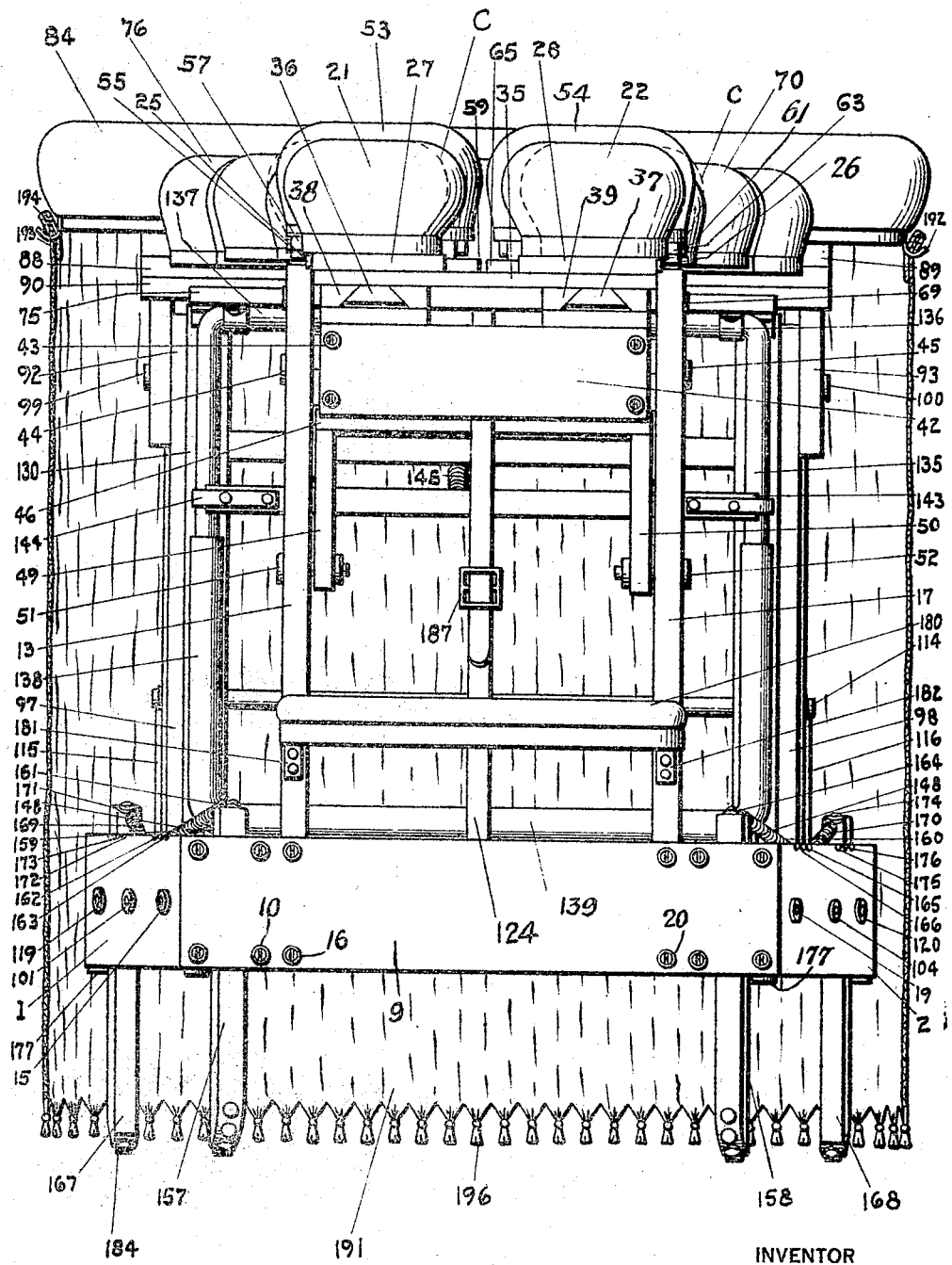
Figure 5:
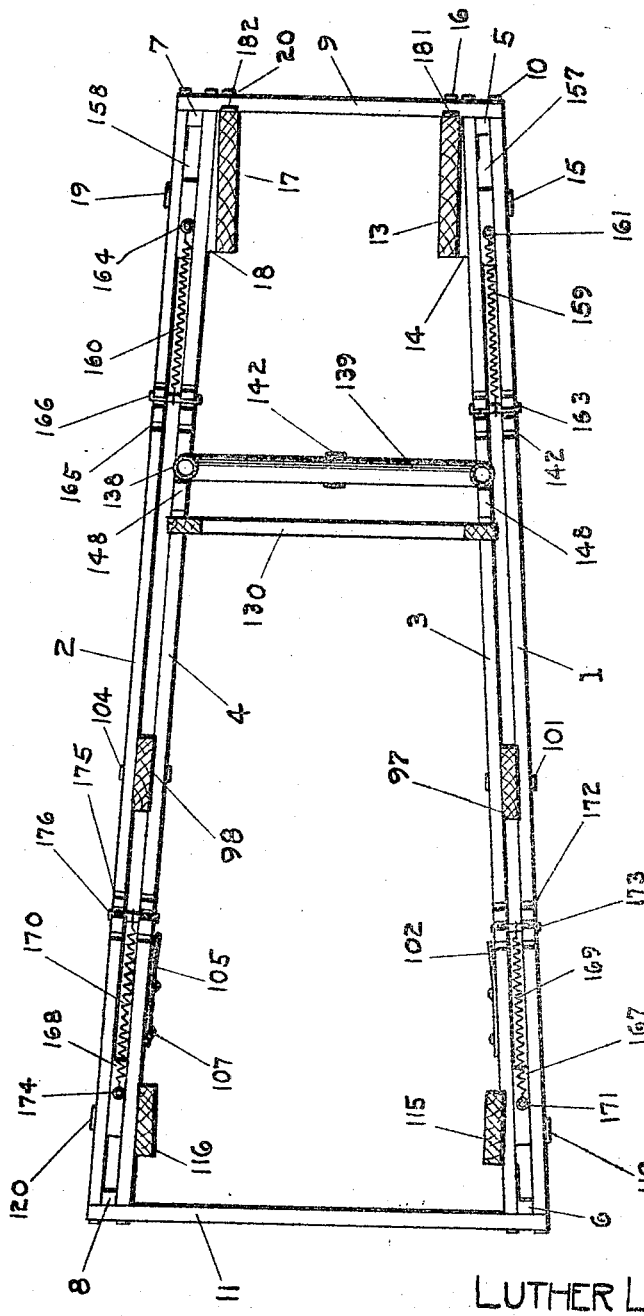
Figure 6:
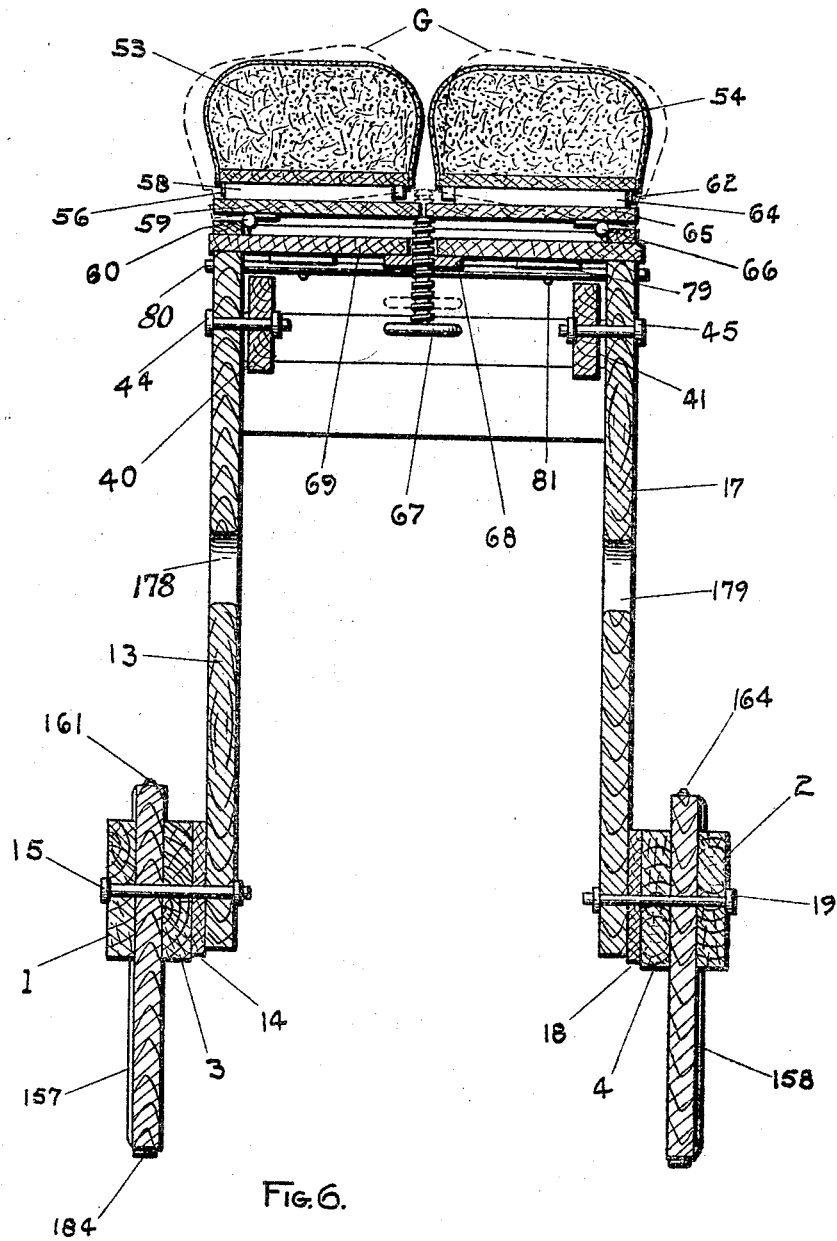
Figure 7:
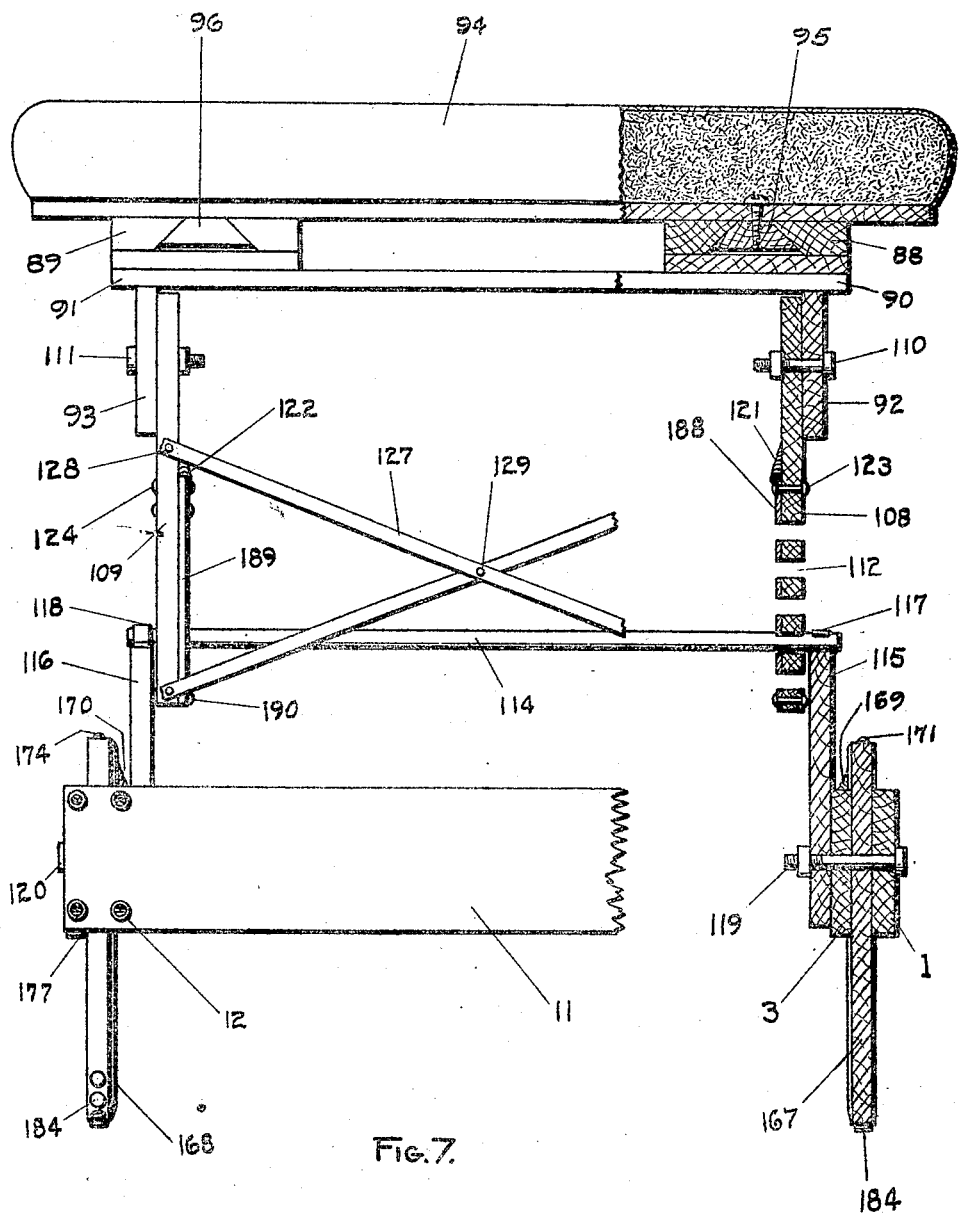
Figure 8:
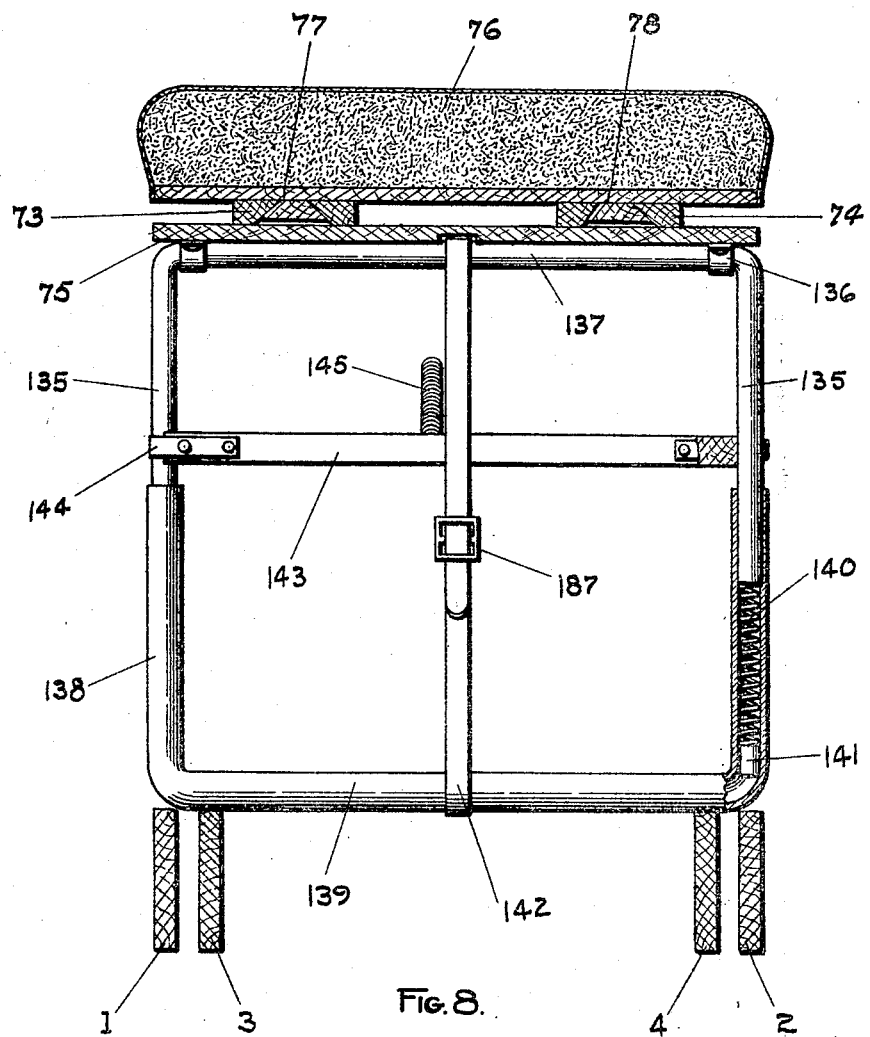
Figure 9:
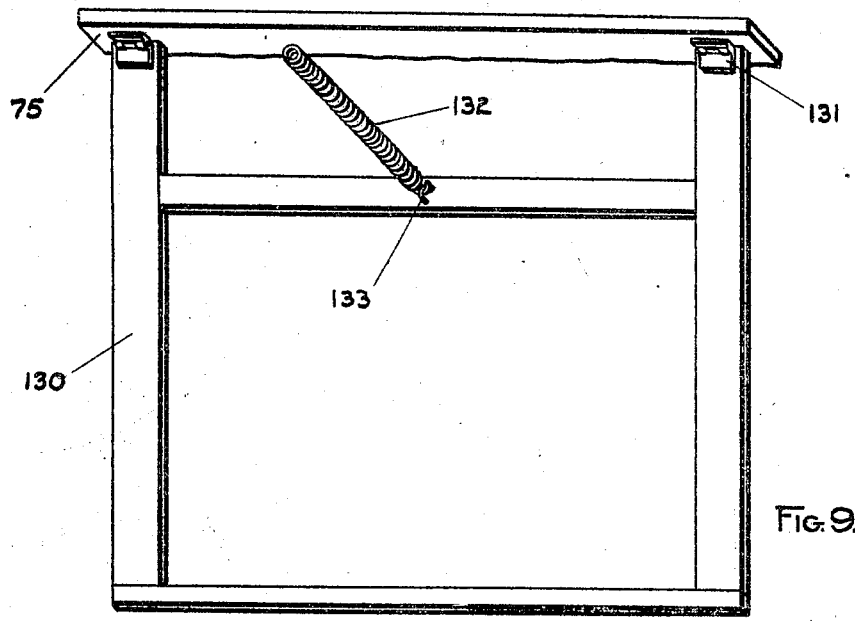
Figure 13:
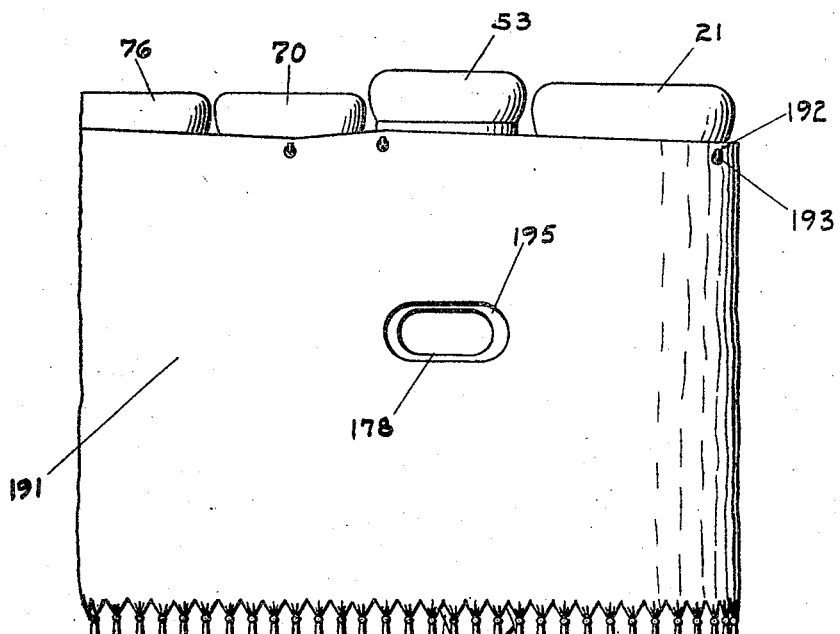

The above and other objects are attained by the structure illustrated in the accompanying drawings, in which Fig. 1 is a sectional side elevation of my invention taken in the proximity of line 1—1 Fig. 2. Fig. 2 is a plan view showing the cushions somewhat normally adjusted, dotted lines indicating certain other adjustments of said cushions as will be understood. Fig. 3 is a side elevation as seen from the same point of observance as Fig. 1, the ornamental curtain means being fragmentarily shown. Fig. 4 is an elevation of the head end of my table showing the ornamental curtain means in section. Fig. 5 is a sectional plan view taken on the line 5—5 Fig. 3. Fig. 6 is a sectional elevation taken in the proximity of line 6—6 Fig. 3. Fig. 7 is a fragmentary sectional view taken in the proximity of line 7—7 Fig. 2. Fig. 8 is a fragmentary sectional view taken in the proximity of line 8—8 Fig. 3 illustrating somewhat in detail a part of my yielding board support means. Fig. 9 is a detail perspective view of my yielding board rigid support means. Fig. 10 is a perspective detail view illustrating my chest cushion height adjusting means showing the highest adjustment thereof. Fig. 11 is a view similar to Fig. 10 showing my chest cushion height adjusting means intermediately adjusted. Fig. 12 is also a view similar to Fig. 10 and shows my chest cushion height adjusting means in the low adjustment thereof. Fig. 13 is a fragmentary side elevation as seen from the same point of observance as Fig. 3 and shows one of the hand holes provided in my ornamental curtain means.

As my invention is a somewhat symmetrical construction, I have designated the medial line thereof A—B in Fig. 2, A designating the forward end of my invention and B designating the rear end. My description will be carried out with respect to the line A—B the relation of parts and different portions thereof being accordingly distinguished by the terms forward and rear respectively.

Referring to the characters, 1 and 2 designate the outer base spans of my invention between which are disposed the corresponding inner side base spans 3 and 4. The forward end of the outer span 1 is secured to the forward end of the inner span 3 by the forward spacer 5, and the rear ends respectively thereof are secured together by means of the rear spacer 6. Also the forward end of the outer span 2 is secured to the forward end of the inner span 4 by the forward spacer 7 and the rear ends respectively thereof are secured together by means of the rear spacer 8. Across the forward ends of said spans is secured the forward sill 9 by means of the screws 10, the rear sill 11 being secured in like manner across the rear ends of said spans by means of the screws 12. By this arrangement a rigid frame is formed by said spans and said sills which I call the base of my invention, the medial point of said sills respectively corresponding to the medial line A—B and said sills being transversely arranged thereto. The standard 13 is located within the interception formed by the inner span 3 and front sill 9, the front edge of which stands adjacent to said sill, said standard being secured to the inner span 3 by means of the spacer 14 and held adjacent thereto by the bolt 15, and also secured to said sill by the screws 16. Likewise the standard 17 is located within the interception formed by the inner span 4 and the front sill 9 the front edge of which stands adjacent to said sill, said standard being secured to the inner span 4 by means of the spacer 18 and held adjacent thereto by the bolt 19 and also secured to said sill by the screws 20. Said standards 13 and 17 extend upward a considerable distance terminating at equal height.

The head cushions 21 and 22 are conveniently furniture type cushions being comprised of resilient stuffing material confined within suitable upholstering coverings. Said cushions are symmetrically arranged with each other in respect to the line A—B, being suitably spaced and adapted to cooperate in supporting the head of a human body, not shown. The cavity 23 of the cushion 21 is formed at the interception of said cushion with the cushion 22 and a corresponding mate cavity 24 is formed on the cushion 22 in symmetrical relation to the cavity 23. Said cavities being both of semi-circular character are adapted to receive a human head in supporting manner especially when said head is placed face downward, the nose protruding between said cushions at said cavities by which arrangement a comfortable face cushion is comprised with ample clearance for the nose and other protrusions.

Secured to the cushion 21 transversely to the line A—B are the dovetails 25 and 26 respectively which are slidably disposed within the guides 27 and 28 respectively, said guides being secured to the guide support 29, and likewise the dovetails 30 and 31 are secured to the cushion 22, being slidably disposed with the guides 32 and 33 which are secured to the guide support 34. By this arrangement said cushions may be adjusted laterally in respect to the line A—B as indicated by the dotted lines C in Fig. 4, the dovetails 25 and 26 being correspondingly slid along in the guides 27 and 28 respectively, and the dovetails 30 and 31 being accordingly slid along in the guides 32 and 33. The guide supports 29 and 34 are connected by the yoke 35 thereby comprising an integral unit to the under side of which are secured the dovetails 36 and 37, parallel to the line A—B, being slidably disposed within the guides 38 and 39 respectively, which are in turn supported by the oscillatable arms 40 and 41 respectively. By this arrangement the head cushions 21 and 22 may be adjusted longitudinally with the line A—B to desired positions as indicated by dotted lines D in Fig. 2 the dovetails 36 and 37 correspondingly sliding along in the guides 38 and 39 respectively.

Across the forward ends of the oscillatable arms 40 and 41 is secured the yoke 42 by screws 43. The other or rear extremities of the oscillatable arms 40 and 41 are disposed between the standards 13 and 17 the arm 40 being pivoted to the standard 13 by the bolt 44 and the arm 41 being pivoted to the standard 17 by the bolt 45. Said arms are thus oscillatable on said bolts, as an integral unit with the yoke 42. Said arms are maintained in desired oscillated adjustment by the lock strip 46 which is adapted to engage in the notches 47 and 48 of the arms 40 and 41 respectively said strip being supported at its extremities by the toggle arms 49 and 50 which are pivoted to the standards 13 and 17 respectively by means of the bolts 51 and 52 respectively. By this arrangement the head cushions 21 and 22 may be accordingly raised and lowered by engaging said lock strip in correspondingly selected notches 47 and 48. In Fig. 1, Fig. 3 and Fig. 4 said head cushions are shown when at their highest adjustment said lock strip being selectively engaged in the notches 47 and 48 which are nearer the pivot bolts 44 and 45 respectively. The dotted lines E in Fig. 1 indicate the lowest adjustment of said cushions in which said lock strip is selectively engaged in the notches 47 and 48 which are farthest from the pivot bolts 44 and 45 respectively. Intermediate height adjustments are accordingly effected by engaging said lock strip in corresponding intermediate selections of the notches 47 and 48 as desired.

The chest cushions 53 and 54 are also furniture type cushions and are located closely to the rear of the head cushions 21 and 22 respectively, being symmetrically arranged to each other in respect to the line A—B. Secured to the under side of the chest cushion 53 transversely to the line A—B are the dovetails 55 and 56 being slidably disposed in the guides 57 and 58 respectively, said guides being supported by the mounting 59 which is in turn hinged to the upper extremity of the standard 13 by the hinges 60. In like manner the dovetails 61 and 62 are secured to the underside of the chest cushion 54, said dovetails being slidably disposed in the guides 63 and 64 respectively, said guides being supported on the mountings 65 which in turn are hinged to the upper extremity of the standard 17 by the hinges 66. By this arrangement said chest cushions may be adjusted laterally in respect to the line A—B to different positions as indicated by the dotted lines F in Fig. 2 the dovetails 55 and 56 being correspondingly slid along in the guides 57 and 58 respectively, and the dovetails 61 and 62 correspondingly slid along in the guides 63 and 64.

The free ends of the hinged mountings 59 and 65 are adjacent and adapted to be supported by the hand screw 67 which is disposed under said free ends in nosed relation thereto, said screw being threaded thru the plate 68 which is secured to the plate support 69 at a medial point thereof, said plate support being in turn supported at the extremities thereof in corresponding perforations of the standards 13 and 17. By manipulation of said hand screw said mountings may be tilted to any desired adjustment thereby adjusting said chest cushions accordingly, as indicated by the dotted lines G of Fig. 6.

The forward abdomen cushion 70 is a furniture type cushion, located closely to the rear of said chest cushions being transversely arranged to the line A—B. To the under side of said front abdomen cushion are secured the dovetails 71 and 72 parallel to said line being slidably disposed in the guides 73 and 74 respectively which are secured to the yielding board 75. By this arrangement said front abdomen cushion may be adjusted longitudinally in respect to said line, as indicated by the dotted lines H in Fig. 2, the dovetails 71 and 72 being correspondingly slid along in the guides 73 and 74 respectively.

The rear abdomen cushion 76 is located directly to the rear of the forward abdomen cushion 70 being parallel thereto, and similarly arranged and constructed. To the under side of said rear abdomen cushion is secured the dovetails 77 and 78 being slidably disposed with the guides 73 and 74 respectively. By this arrangement said rear abdomen cushion may be also adjusted longitudinally in respect to the line A—B to different positions as indicated by the dotted lines I of Fig. 2.

The prongs 79 are secured to the underside of the yielding board 75 and extend from the forward portion of said board, the outer extremities of said prongs being disposed between the standards 13 and 17. The guide rod 80 extends across said extremities being secured thereto by means of the screws 81. The extremities of said guide rod are disposed within the vertical slots 82 and 83 of the standards 13 and 17 respectively by which arrangement the movements of said yielding board are restricted longitudinally but given freedom of vertical movement. The rear portion of said yielding board is either flexibly or rigidly supported as desired, as will be understood.

The thigh cushion 84 is also a furniture type cushion being similar in construction to the previously described cushions but being considerably larger. A cavity 85 is formed in the forward portion of said thigh cushion on the line A—B and is adapted to give suitable clearance to the sexual organs of a human body, not shown, the thighs of which are normally supported by said thigh cushion. The dovetails 86 and 87 are secured to the underside of said cushion parallel to said line and are slidably disposed in the guides 88 and 89 respectively which are secured to the arches 90 and 91 being transversely arranged thereto. By this arrangement the said thigh cushion may be adjusted longitudinally with the medial line A—B to different positions as indicated by the dotted lines J in Fig. 2, the dovetails 86 and 87 being correspondingly slid along in the guides 88 and 89 respectively. The extremities of the arches 90 and 91 are secured to the extremities of the tilting members 92 and 93 forming a somewhat rectangular construction therewith.

The knee cushion 94 serves as the extreme rear cushion of my invention and is adapted to support the knees of a human body when the other parts of same are supported by the respective above described cushions. The dovetails 95 and 96 are secured to the underside of said knee cushion and are also slidably disposed in the guides 88 and 89 respectively by which arrangement said knee cushion is longitudinally adjustable with respect to the medial line A—B to different positions as indicated by the dotted lines K in Fig. 2, the dovetails 95 and 96 being correspondingly slid along in the guides 88 and 89 respectively.

It will be obvious that the cushions of my invention are suitably arranged to cooperate in supporting a human body, respective cushions being adapted to support respective parts of such body, said cushions being arranged in order as stated, the face cushions 21 and 22, the chest cushions 53 and 54, the forward abdomen cushion 70, the rear abdomen cushion 76, the thigh cushion 84 and the knee cushion 94.

The tiltable members 92 and 93 are pivoted at the forward ends thereof to the upper extremities of the uprights 97 and 98 respectively by the bolts 99 and 100 respectively. The lower extremity of the upright 97 is disposed between the outer base span 1 and the inner base span 3 being secured thereto by means of the bolt 101. The brace 102 serves to maintain said upright in vertical position, the upper end of said brace being secured in angular relation thereto by means of the screws 103 and the lower end of said brace being in like manner secured to the inner base span 3.

Likewise the lower extremity of the upright 98 is disposed between the outer base span 2 and the inner base span 4 and secured thereto by means of the bolt 104. The brace 105 is arranged similar to the brace 102 and serves to maintain the upright 98 in vertical position the upper end of said brace being secured in angular relation to same by means of the screws 106 and the lower end of said brace being in like manner secured to the inner base span 4 by means of the screws 107.

The legs 108 and 109 are secured to the tiltable members 92 and 93 respectively by the bolts 110 and 111 respectively said legs normally extending downward. The notches 112 and 113 of said legs respectively are adapted to engage the cross rod 114, the extremities of said rod being secured to the brackets 115 and 116 by means of the cleats 117 and 118 respectively said brackets being in turn secured to the inner base spans 3 and 4 respectively by means of the bolts 119 and 120 respectively. The contraction coil spring means 121 and 122 are adapted to retain said notches in engagement with said cross rod, the lower ends of said means being secured to said legs respectively by means of the screws 123 and 124 respectively and the upper ends thereof being secured to the tiltable members 92 and 93 respectively by means of the screws 125 and 126 respectively. Different adjustment of the tiltable members 92 and 93 may be effected by selectively engaging different ones of the notches 112 and 113 with the cross rod 114 by which desired tilted adjustments of the knee cushion 94 and the thigh cushion 84 may be correspondingly effected as indicated by the dotted lines L in Fig. 3. Said legs are united by the intersecting braces 127 respective ends of which are secured to same by means of the screws 128. Said braces are secured together at their intersecting points by means of the bolt 129 and serve not only to maintain the rigidness of said legs but also as a handle by which said notches may be normally oscillated out of engagement with the cross rod 114 in opposition to the springs 121 and 122, said legs being correspondingly oscillating on the pivot bolts 110 and 111 and the adjustments of said legs may be thus simultaneously carried out with respect to said cross rod.

Referring again to the yielding board 75 the rear end thereof may be rigidly supported as desired by the rectangular shaped strut 130 which is hinged to said yielding board by means of the hinges 131 and extends downward therefrom in vertical position. Fig. 9 is a somewhat detail perspective view of said strut. A contraction coil spring means 132 tends to swing said strut from vertical position to the position indicated by the dotted lines M in Fig. 1 one end of said spring means being secured to said strut by means of the cleat 133 and the other end being secured to the arch 90 by means of the connection 134. The base of said strut however, may be held in contact with the base spans 1, 3, 4 and 2 in transverse relation thereto, by the combined weight of said yielding board, the guides 73 and 74, the dovetails 71 and 72 and the abdomen cushions 70 and 76 in opposition to said spring means. When it is desired however, to have said yielding board unsupported by said strut, said yielding board may be manually lifted slightly by which said strut will be correspondingly lifted out of contact with said base spans permitting the spring means 132 to automatically swing said strut on the hinges 131 and thus out of use into the position indicated by the dotted lines M in Fig. 1. Said strut can however, be returned to rigid vertical position by manual manipulation as desired.

When said strut is thus swung out of vertical position the weight of the yielding board 75 may be received by the legs 135 which are pivoted to the lower surface of said yielding board, near the strut 130 and forward therefrom, by means of the cleats 136, said legs being connected as an integral unit by the yoke 137 as shown in Fig. 8. The free extremities of said legs extend downward and are disposed within the sleeves 138 and in telescoping relation thereto, the lower extremities of said sleeves forming a continuation with the yoke 139. Within said sleeves are the expansion coil springs 140 shown in Fig. 8 supported by the spring seats 141. The upper ends of said expansion coil springs embrace the lower surfaces of the legs 135 exerting their tension upwardly which tends to eject said legs out of said sleeves. Such ejecting tendency is prevented however, by the double strand flexible strap 142 which closely surrounds both the yoke 137 and the yoke 139 thereby serving as a stop in opposition to said ejecting tendency. When the yielding board 75 is thus supported by the legs 135 sufficient downward thrust upon either or both the abdomen cushions 70 and 76 will force said board downward the expansion springs 140 being adapted to yield accordingly with the corresponding downward movement of the legs 135.

The extremities of the horizontal bar 143 are secured to the legs 135 by means of the clips 144. At a medial point of said bar the contraction coil spring means 145 is attached by the cleat 146, the other end of said means being attached to the arch 90 by means of the connection 147. Said spring means is thereby adapted to oscillate the legs 135 with the sleeves 138 and the yoke 137 in the cleats 136 to a position indicated by the dotted lines N in Fig. 1. Such oscillation is normally prevented by the catch means 148 secured to the upper surface of the inner base spans 3 and 4 which are adapted to overlap the yoke 139. When desired however, to have the said legs thus oscillated the yielding board 75 may be manually lifted sufficient to remove the yoke 139 from engagement with said catch means and the spring means 145 will act to oscillate said legs as desired.

As before mentioned longitudinal movements of the yielding board 75 are restricted by the vertical slots 82 and 83 of the standards 13 and 17 respectively by means of the guide rod 80 the extremities of which engage said slots, said rod being rigidly connected to said yielding board by means of the prongs 79. Said slots are of sufficient length however, to permit considerable up and down movement of said rod by which the forward end of said yielding board may be adjusted to higher or lower positions correspondingly moving said rod to high or low positions by which arrangement the height and angle of the abdomen cushions 70 and 76 may be varied as desired as indicated by dotted lines O in Fig. 1.

The folding ledge 149 is adapted to support the prongs 79 when desired, being hinged to the intermediate ledge 150 by means of the hinges 151 said intermediate ledge being in turn hinged to the rigid ledge 152 by the hinges 153 said rigid ledge being secured at the extremities thereof to the standards 13 and 17 by the screws 154. Referring to Fig. 1, Fig. 3 and Fig. 10, the folding ledge 149 is shown adjusted to support the prongs 79 in which case the forward abdomen cushion 70 is thus supported at a comparatively high position. By folding said folding ledge downward on the hinges 151 to a position indicated in Fig. 11 the prongs 79 correspondingly move downward into contact with the upper edge of the intermediate ledge 150 thus giving a corresponding lower adjustment to the abdomen cushions 70 and 76 and changing the angle of said cushions as shown by the dotted lines O in Fig. 1. Also by folding the intermediate ledge 150 downward to a position shown in Fig. 12 the prongs 79 may be similarly permitted to move downward to a still lower adjustment being supported directly by the rigid ledge 152. Under certain conditions it is desired to thrust the abdomen cushions 70 and 76 downward to a position indicated by the dotted lines P in Fig. 3 which also shows said prongs resting at their low adjustment just described. It is however, understood that such downward thrust adjustment of said abdomen cushions may take place during either adjustment of said prongs, or of the ledges 149 and 150, or of the legs 135 as desired, the strut 130 being in oscillated position.

When the strut 130 and the legs 135 are oscillated into positions indicated by the dotted lines M and N respectively of Fig. 1, the said abdomen cushions are normally supported by the contraction coil spring means 154, the forward ends of which are secured to the rear edge of the yielding board 75 by the cleat 155, the rear ends of said means being secured to the guides 88 and 89 by the connections 156. Said spring means is adapted to yield when said abdomen cushions are thrust downward as also indicated by the dotted lines P of Fig. 3, and acts to withdraw said cushions from such downward position, it being understood that the spring means 154 cooperates in such withdrawing action with the springs 140 when the legs 135 are in use.

The forward ends of the base spans 1, 3, 4 and 2 respectively are supported by the forward legs 157 and 158, the leg 157 being disposed between the outer base span 1 and the inner base span 3 at forward points thereof and pivoted thereto by the bolt 15 which also serves to secure the standard 13 to the inner span 3 as described above, and the leg 158 being disposed between the outer base span 2 and the inner base span 4 at forward points thereof and pivoted thereto by the bolt 19 which also serves to secure the standard 17 to the inner span 4 as described above. Said forward legs stand normally at an angle the lower extremities thereof being located somewhat forward in respect to the bolts 15 and 19 respectively such forward position being determined by the spacers 5 and 7 which are adapted to serve as stops against which said legs are adapted to be oscillated on said bolts.

Contraction coil springs 159 and 160 are adapted to thus oscillate said legs into contact with said spacers the upper end of the spring 159 being secured to the upper extremity of the leg 157 by means of the screw 161 and the lower end of said spring being locked to one of the notches 162 of the spans 1 and 3 by means of the pin 163, and the upper end of the spring 160 being secured to the upper extremity of the leg 158 by means of the screw 164 and the lower end thereof being locked to one of the notches 165 of the spans 4 and 2 by means of the pin 166. The tension of said springs may be varied by locking said lower ends thereof to different ones of the notches 162 and 165 as desired.

The rear ends of the base spans 1, 3, 4, and 2 respectively are supported by the rear legs 167 and 168 the leg 167 being disposed between the outer base span 1 and the inner base span 3 at rear points thereof and pivoted thereto by the bolt 119 which also serves to secure the bracket 115 to the inner base span 3 as described above, and the leg 168 being disposed between the outer base span 2 and the inner base span 4 at rear points thereof and pivoted thereto by the bolt 120 which also serves to secure the bracket 116 to the inner base span 4 as described above. Said rear legs stand normally at an angle the lower extremities thereof being located somewhat to the rear in respect to the bolts 119 and 120 respectively such rear position being determined by the spacers 6 and 8 adapted to serve as stops against which said legs are adapted to be oscillated on said bolts.

Contraction coil springs 169 and 170 are adapted to thus oscillate said legs into contact with said spacers the upper end of the spring 169 being secured to the upper extremity of the leg 167 by means of the screw 171 and the lower end thereof being locked to one of the notches 172 of the spans 1 and 3 by means of the pin 173, and the upper end of the spring 170 being secured to the upper extremity of the leg 168 by means of the screw 174 and the lower end thereof being locked to one of the notches 175 of the spans 4 and 2 by means of the pin 176. The tension of said springs may be varied by locking said lower ends thereof to different ones of the notches 172 and 175 as desired.

The base spans 1, 3, 4 and 2 may be otherwise supported as desired by the button shaped protrusions 177 which are secured to the under side of the sills 9 and 11 and adapted to serve as a supporting means during the use of which the forward legs 157 and 158 are oscillated to horizontal position as indicated by the dotted lines Q in Fig. 3 and the rear legs 167 and 168 are oscillated to a horizontal position as indicated by the dotted lines R in Fig. 3.

At a medial point of the standards 13 and 17 are formed the holes 178 and 179 which are adapted to receive the hands of a patient in a restful manner when such patient is lying face downward, the different cushions supporting respective parts of such patient's body. The horizontal pad 180 is also adapted to support the hands of a patient when desired when lying in such position. The extremities of said pad are secured to the standards 13 and 17 by means of the brackets 181 and 182 respectively.

The compression coil springs 183 are disposed within the interior of the thigh cushion 84 near the forward edge thereof and are located on opposite sides of the cavity 85. Said springs are adapted to exert their tension between the lower and upper parts of said cushion and are suitably spaced to be directly under the thighs of a patient normally supported by my invention. Said springs are thereby adapted to serve as a reinforcement for the stuffing material within said thigh cushion.

The protrusions 184 on the lower extremities forward and rear legs 157, 158, 167 and 168 terminate in smooth surfaces and thus are adapted to serve as supporting feet for said legs and will therefore not be destructive to a floor surface upon which they rest.

The spring means 145, 132 and 154 are secured to the connections 147, 134 and 156 respectively by similar flexible loops 185 preferably constructed of leather, said loops being threaded thru the rear ends of their respective springs and also thru said connections respectively. Buckles 186 serve to connect the ends of said loops by which arrangement said loops may be adjusted in length to vary the tension of said springs.

A conventional buckle 187 is also provided on the strap 142 serving to connect the ends thereof in adjustable manner by which the limit of upward movement of the abdomen cushions 70 and 76 may be varied.

The plates 188 and 189 are riveted to the legs 108 and 109 adjacent to the notches 112 and 113 respectively by the rivets 190. Said plates are adapted to reinforce said notches corresponding in shape and arrangement thereto.

A flexible curtain 191 surrounds my invention and serves as a skirt whereby the lower mechanisms thereof are concealed from normal view, said curtain being suspended from the hooks 192 which are suitably spaced along on the above described cushions, said hooks being engaged in corresponding holes 193 of said curtain.

Said curtain is preferably of ornamental design and gives a neatness of appearance to my invention as a whole. A gathering cord 194 of stretchable construction preferably rubber is threaded in said curtain along the upper edge thereof and is adapted to yield when the said cushions are adjusted as described above and serves to prevent sagging or overtightness thereof.

Referring to Fig. 13 hand holes 195 are provided in said curtain, corresponding in location to the holes 178 and 179 thru which access may be had to same and also to the pad 180.

The tassels 196 are suspended from said curtain being arranged to serve as an ornamental fringe therefor. Said tassels are of suitable length to slightly clear a conventional floor upon which my invention is supported by the legs 157, 158, 167 and 168. Said tassels are however, adapted to yield from contact with such floor when said legs are horizontally adjusted as above described.

In bringing my invention into use the cushions thereof are adjusted to correspond to the length of the patient's body as indicated by the above described dotted lines in Fig. 2 and the head cushions are adjusted as indicated by the dotted lines C in Fig. 4. After such adjustments are properly made the patient usually lies face downward at the cavities 23 and 24, other parts of the patient's body being correspondingly supported by respective cushions. The abdomen cushions 70 and 76, and the chest cushions 53 and 54 are then adjusted as to suitable height and angle for the patient's comfort in the manner previously described above.

After the patient has been thus placed, chiropractic treatments are carried out as understood by those familiar with the art.

The patient's body may be placed face upward as desired, respective parts being supported by respective cushions.

While I have illustrated in a general way certain instrumentalities which may be employed in carrying my invention into effect, it is evident that many modifications may be made in the various details without departing from the scope of the appending claims, it being understood that my invention is not restricted to the particular form of mechanisms herein described.

I claim as my invention:

1. In a chiropractic mechanism, a pair of adjacent head cushions, independent slides secured to said cushions transversely to their interception, guide means adapted to guide said slides, slide means secured to said guide means parallel to said interception, guide means adapted to guide the last mentioned slide means, arm means supporting said last mentioned guide means and having notches on the underside thereof, stationary members pivoted to the extremities of said arm means, a toggle means pivoted to said members and adapted to selectively engage said notches to vary the height and angle of said head cushions as desired.

2. In a chiropractic mechanism, a cushion means adapted to support the right chest of a human body, another cushion means adapted to support the left chest of a human body, independent slide means secured to each of said cushion means, guide means adapted to guide said slide means and screw means disposed under respective parts of said guide means in nosed relation thereto for changing the angles of same.

3. In a chiropractic mechanism, a pair of cooperatable chest cushions, respective guide means secured independently to said cushions transversely to the interception thereof, respective guide means adapted to guide said slide means, hinge means adapted to support respective edges of said guide means and a screw means disposed under said guide means in nosed relation thereto, adapted to tilt said cushions as desired on said hinge means.

4. In a chiropractic mechanism, abdomen cushion means, slide means secured to said cushion means, guide means adapted to guide said slide means, pivot means adapted to support one end of said guide means, a rod means secured to the other end of said guide means and a slotted means adapted to surround the extremities of said rod means for restricting the movements of said cushion means.

5. In a chiropractic mechanism, the combination of a forward cushion adapted to support the upper abdomen of a human body, a rear cushion adapted to support the lower abdomen of a human body, independent slide means secured to each of said cushions, guide means adapted to guide said slide means, a pivot means adapted to support one end of said guide means, a longitudinal rod means secured to the other end of said guide means and vertical slotted means adapted to contain the extremities of said rod means for restricting the movements of said guide means.

6. In a chiropractic mechanism, abdomen cushion means, slide means secured to said cushion means, guide means adapted to guide said slide means, pivot means adapted to support the rear end of said guide means, a foldable ledge means adapted to support the forward end of said guide means, an intermediate ledge means hinged to said foldable ledge means by which said foldable ledge is adapted to fold downward until said forward end rests on said intermediate ledge and a fixed ledge hinged to said intermediate ledge, said intermediate ledge being adapted to be folded downward until said forward end rests on said fixed ledge, for changing the position of said cushion means.

7. In a chiropractic mechanism, the combination of a forward cushion adapted to support the upper abdomen of a human body, a rear cushion adapted to support the lower abdomen of a human body, independent slide means secured to each of said cushions, a guide means adapted to guide said slide means, a pivot means adapted to support one end of said guide means, a ledge means adapted to support the other end of said guide means, said ledge means being comprised of foldable sections of different heights whereby the supporting height of said ledge means may be varied.

8. In a chiropractic mechanism, abdomen cushion means, slide means secured to said cushion means, guide means adapted to guide said slide means, pivot means adapted to support one end of said guide means, a rod means secured to the other end of said guide means, slotted means adapted to surround the extremities of said rod means for restricting the movements of said cushion means, and a ledge means adapted to support said other end, said ledge means comprising foldable sections of different heights for changing the supporting height of said ledge means.

9. In a chiropractic mechanism, abdomen cushion means, slide means secured to said cushion means, guide means adapted to guide said slide means, pivot means adapted to support the rear end of said guide means, a foldable ledge means adapted to support the forward end of said guide means, an intermediate ledge means hinged to said foldable ledge means by which said foldable ledge is adapted to fold downward until said forward end rests on said intermediate ledge, a fixed ledge hinged to said intermediate ledge by which said intermediate ledge is adapted to be folded downward until said forward end rests on said fixed ledge, for changing the position of said cushion means, a rod means secured to said guide means and vertical slotted means adapted to contain the extremities of said rod means for restricting the movements of said member.

10. In a chiropractic mechanism, an abdomen cushion means, a leg means pivoted to said cushion means extending downward therefrom, a sleeve means adapted to receive said leg means in telescoping relation thereto, spring means adapted to support said leg means in said sleeve means, a spring means tending to oscillate said leg means from vertical position, a strut means hinged to said cushion means extending downward therefrom and a spring means tending to oscillate said strut means from vertical position.

11. In a chiropractic mechanism, an abdomen cushion means, a leg means pivoted to said cushion means extending downward therefrom, a sleeve means adapted to receive said leg means in telescoping relation thereto, spring means adapted to support said leg means in said sleeve means, a strut means hinged to said cushion means extending downward therefrom, and a spring means tending to oscillate said strut means from vertical position.

12. In a chiropractic mechanism, an abdomen cushion means, a leg means pivoted to said cushion means extending downward therefrom, a sleeve means adapted to receive said leg means in telescoping relation thereto, spring means adapted to support said leg means in said sleeve means, a spring means tending to oscillate said leg means from vertical position, and a strut means hinged to said cushion means extending downward therefrom.

13. In a chiropractic mechanism, an abdomen cushion means, slide means secured to said cushion means, guide means adapted to guide said slide means, a leg means pivoted to one end of said guide means extending downward therefrom, sleeve means adapted to receive said leg means in telescoping relation thereto, a spring means adapted to support said leg means in said sleeve means, a rod means secured to said guide means, slotted means adapted to surround the extremities of said rod means in restricting the movements of said guide means and a ledge means adapted to support the other end of said guide means said ledge means comprising foldable sections of different heights for changing the supporting height of said ledge means.

14. In a chiropractic mechanism, abdomen cushion means, slide means secured to said cushion means, guide means adapted to guide said slide means, a strut means hinged to one end of said guide means extending downward therefrom, spring means tending to oscillate said strut means from vertical position, a horizontal rod means secured to said guide means, slotted means adapted to surround the extremities of said rod means for restricting the movements of said guide means, and a ledge means adapted to support the other end of said guide means, comprising foldable sections of different heights for changing the supporting height of said ledge means.

15. In a chiropractic mechanism, an abdomen cushion means, a leg means pivoted to one end of said cushion means extending downward therefrom, sleeve means adapted to receive said leg means in telescoping relation thereto, a spring means adapted to support said leg means in said sleeve means and ledge means adapted to support the other end of said cushion means said ledge means comprising foldable sections of different heights for changing the supporting height of said ledge means.

16. In a chiropractic mechanism, an abdomen cushion means, a strut means hinged to one end thereof extending downward therefrom, a spring means tending to oscillate said strut means from vertical position, a ledge means adapted to support the other end of said cushion means said ledge means comprising foldable sections of different heights for changing the supporting height of said ledge means.

17. In a chiropractic mechanism, an abdomen cushion means, a leg means pivoted to one end of said cushion means extending downward therefrom, sleeve means adapted to receive said leg means in telescoping relation thereto, a spring means adapted to support said leg means in said sleeve means, a strut means hinged to said cushion means extending downward therefrom cooperating with said leg means in supporting said cushion means, a ledge means adapted to support the other end of said cushion means said ledge means comprising foldable sections of different heights for changing the supporting height of said ledge means.

18. In a chiropractic mechanism, an abdomen cushion means, a leg means pivoted to said cushion means extending downward therefrom, sleeve means adapted to receive said leg means in telescoping relation thereto, a spring means adapted to support said leg means in said sleeve means, a strut means hinged to said cushion means extending downward therefrom cooperating with said leg means in supporting said cushion means, a prong means secured to said cushion means, longitudinal rod means secured to said prong means and vertical slotted means adapted to contain the extremities of said rod means for restricting the movements of said cushion means.

19. In a chiropractic mechanism, the combination of a forward cushion adapted to support the upper abdomen of a human body, a rear cushion adapted to support the lower abdomen of the human body, independent slide means secured to each of said cushions, guide means adapted to guide said slide means, a strut means hinged to said guide means extending downward therefrom, a spring means tending to oscillate said strut means from vertical position, a rod means secured to said guide means and a slotted means adapted to contain the extremities of said rod means for restricting the movements of said guide means.

20. In a chiropractic mechanism the combination of a forward cushion adapted to support the upper abdomen of a human body, a rear cushion adapted to support the lower abdomen of a human body, independent slide means secured to each of said cushion means, guide means adapted to guide said slide means, a rod means secured to said guide means, slotted means adapted to contain the extremities of said rod means for restricting the movements of said guide means, a ledge means adapted to support one end of said guide means, said ledge means comprising foldable sections of different heights for changing the supporting height of said ledge means.

21. In a chiropractic mechanism, an abdomen cushion means, a leg means pivoted to one end of said cushion means extending downward therefrom, sleeve means adapted to receive said leg means in telescoping relation thereto, a spring means adapted to support said leg means in said sleeve means, ledge means adapted to support the other end of said cushion means, said ledge means comprising foldable sections of different heights for changing the supporting height of said ledge means, a prong means secured to said cushion means, rod means secured to said prong means and slotted means adapted to contain the extremities of said rod means for restricting the movements of said cushion means.

22. In a chiropractic mechanism the combination of a forward cushion adapted to support the upper abdomen of a human body, a rear cushion adapted to support the lower abdomen of a human body, independent slide means secured to each of said cushion means, guide means adapted to guide said slide means, a leg means pivoted to said guide means extending downward therefrom, sleeve means adapted to receive said leg means in telescoping relation thereto, a spring means adapted to support said leg means in said sleeve means, a rod means secured to said guide means and slotted means adapted to contain the extremities of said rod means for restricting the movements of said guide means.

23. In a chiropractic mechanism the combination of a forward cushion adapted to support the upper abdomen of a human body, a rear cushion adapted to support the lower abdomen of a human body, independent slide means secured to each of said cushions, guide means adapted to guide said slide means, a leg means pivoted to said guide means extending downward therefrom, sleeve means adapted to receive said leg means in telescoping relation thereto, a spring means adapted to support said leg means in said sleeve means, a ledge means adapted to support one end of said guide means, said ledge means comprising foldable sections of different heights for changing the supporting height of said ledge means.

24. In a chiropractic mechanism, an abdomen cushion means, ledge means adapted to support one end of said cushion means, said ledge means comprising foldable sections of different heights for changing the supporting height of said ledge means, a strut means hinged to said cushion means extending downward therefrom to partly support said cushion means, a prong means secured to said cushion means, rod means secured to said prong means and slotted means adapted to contain the extremities of said rod means for restricting the movements of said cushion means.

25. In a chiropractic mechanism, an abdomen cushion means, a leg means pivoted to one end of said cushion means extending downward therefrom, sleeve means adapted to receive said leg means in telescoping relation thereto, a spring means adapted to support said leg means in said sleeve means, ledge means adapted to support the other end of said cushion means, said ledge means comprising foldable sections of different heights for changing the supporting height of said ledge means and a strut means hinged to said cushion means extending downward therefrom cooperating with said leg means in supporting said cushion means.

26. In a chiropractic mechanism the combination of an abdomen cushion means, slide means secured to said cushion means, guide means adapted to guide said slide means, leg means pivoted to one end of said guide means extending downward therefrom, sleeve means adapted to receive said leg means in telescoping relation thereto, a spring means adapted to support said leg means in said sleeve means, a strut means hinged to said cushion means extending downward therefrom, and a spring means tending to oscillate said strut means from vertical position.

27. In a chiropractic mechanism the combination of a forward cushion adapted to support the upper abdomen of a human body, a rear cushion adapted to support the lower abdomen of a human body, independent slide means secured to each of said cushion means, guide means adapted to guide said slide means, a leg means pivoted to said guide means extending downward therefrom, sleeve means adapted to receive said leg means in telescoping relation thereto, a spring means adapted to support said leg means in said sleeve means, a rod means secured to said guide means, slotted means adapted to contain the extremities of said rod means for restricting the movements of said guide means, a ledge means adapted to support one end of said guide means, said ledge means comprising foldable sections of different heights for changing the supporting height of said ledge means.

28. In a chiropractic mechanism, an abdomen cushion means, a leg means pivoted to one end of said cushion means extending downward therefrom, sleeve means adapted to receive said leg means in telescoping relation thereto, a spring means adapted to support said leg means in said sleeve means, ledge means adapted to support the other end of said cushion means, said ledge means comprising foldable sections of different heights for changing the supporting height of said ledge means, a strut means hinged to said cushion means extending downward therefrom cooperating with said leg means in supporting said cushion means, a prong means secured to said cushion means, rod means secured to said prong means and slotted means adapted to contain the extremities of said rod means for restricting the movements of said cushion means.

29. In a chiropractic mechanism, an abdomen cushion means, slide means secured to said cushion means, guide means adapted to guide said slide means, a leg means pivoted to one end of said guide means extending downward therefrom, sleeve means adapted to receive said leg means in telescoping relation thereto, a spring means adapted to support said leg means in said sleeve means, a rod means secured to said guide means, slotted means adapted to surround the extremities of said rod means to restrict the movements of said guide means, a strut means hinged to said cushion means extending downward therefrom and a spring means tending to oscillate said strut means from vertical position.

30. In a chiropractic mechanism a forward cushion means adapted to support the upper abdomen of a human body, a rear cushion means adapted to support the lower abdomen of a human body, independent slide means secured to each of said cushion means, guide means adapted to guide said slide means, a strut means hinged to one end of said guide means extending downward therefrom, rod means secured to the other end of said guide means, slotted means adapted to surround the extremities of said rod means for restricting the movements of said guide means and a ledge means adapted to support said other end of said guide means comprising foldable sections of different heights for changing the supporting height of said ledge means.

31. In a chiropractic mechanism the combination of an abdomen cushion means, slide means secured to said cushion means, guide means adapted to guide said slide means, leg means pivoted to one end of said guide means extending downward therefrom, sleeve means adapted to receive said leg means in telescoping relation thereto, a spring means adapted to support said leg means in said sleeve means, a ledge means adapted to support the other end of said guide means said ledge means comprising foldable sections of different heights for changing the supporting height of said ledge means, a strut means hinged to said cushion means extending downward therefrom, and a spring means tending to oscillate said strut means from vertical position.

32. In a chiropractic mechanism a forward cushion means adapted to support the upper abdomen of a human body, a rear cushion means adapted to support the lower abdomen of a human body, independent slide means secured to each of said cushion means, guide means adapted to guide said slide means, a leg means pivoted to said guide means, at one end, extending downward therefrom, a sleeve means adapted to receive said leg means in telescoping relation thereto, a spring means adapted to support said leg means in said sleeve means, rod means secured to the other end of said guide means, slotted means adapted to surround the extremities of said rod means for restricting the movements of said guide means, a strut means hinged to said guide means extending downward therefrom, adapted to partly support said guide means, and a ledge means adapted to support said other end of said guide means comprising foldable sections of different heights for changing the supporting height of said ledge means.

33. In a chiropractic mechanism, an abdomen cushion means, leg means pivoted thereto and extending downward therefrom, a leg extension means adapted to meet said leg means in telescoping relation, spring means adapted to support said leg means, stop means adapted to restrict the action of said spring means, spring means tending to oscillate said leg means from vertical position and a degageable catch means adapted to restrain oscillation of said leg means.

34. In a chiropractic mechanism, an abdomen cushion means, leg means extending downward therefrom, a leg extension means adapted to meet said leg means in telescoping relation, spring means adapted to support said leg means, stop means adapted to restrict the action of said spring means, a strut means hinged to said cushion means extending downward therefrom in supporting manner, a spring means tending to oscillate said strut means from vertical position and a degageable friction means adapted to restrain oscillation of said strut means.

35. In a chiropractic mechanism, an abdomen cushion means, leg means pivoted thereto and extending downward therefrom, a leg extension means adapted to meet said leg means in telescoping relation, spring means adapted to support said leg means, stop means adapted to restrict the action of said spring means, spring means tending to oscillate said leg means from vertical position, a degageable catch means adapted to restrain oscillation of said leg means, a strut means hinged to said cushion means extending downward therefrom in supporting manner, a spring means tending to oscillate said strut means from vertical position and a degageable friction means adapted to restrain oscillation of said strut means.

36. In a chiropractic mechanism, an abdomen cushion means, a leg means pivoted to one end of said cushion means extending downward therefrom, a leg extension means adapted to meet said leg means in telescoping relation thereto, a spring means adapted to support said leg means, a spring means tending to oscillate said leg means, degageable means adapted to restrain oscillation of said leg means, and ledge means adapted to support the other end of said cushion means said ledge means comprising foldable sections of different heights for changing the supporting height of said ledge means.

37. In a chiropractic mechanism, an abdomen cushion means, a strut means hinged to one end thereof extending downward therefrom, a spring means tending to oscillate said strut means from vertical position, degageable means adapted to restrain oscillation of said strut means, a ledge means adapted to support the other end of said cushion means said ledge means comprising foldable sections of different heights for changing the supporting height of said ledge means.

38. In a chiropractic mechanism, an abdomen cushion means, a leg means pivoted to one end of said cushion means extending downward therefrom, leg extension means adapted to meet said leg means in telescoping relation thereto, a spring means adapted to support said leg means, a spring means tending to oscillate said leg means, degageable means adapted to restrain oscillation of said leg means, a strut means hinged to said cushion means extending downward therefrom cooperating with said leg means in supporting said cushion means, spring means tending to oscillate said strut means, degageable means adapted to restrain oscillation of said strut means, a ledge means adapted to support the other end of said cushion means said ledge means comprising foldable sections of different heights for changing the supporting height of said ledge means.

39. In a chiropractic mechanism, an abdomen cushion means, a leg means pivoted to said cushion means extending downward therefrom, leg extension means adapted to meet said leg means in telescoping relation thereto, a spring means adapted to support said leg means, a spring means tending to oscillate said leg means, degageable means adapted to restrain oscillation of said leg means, a strut means hinged to said cushion means extending downward therefrom cooperating with said leg means in supporting said cushion means, spring means tending to oscillate said strut means, degageable means adapted to restrain oscillation of said strut means, a prong means secured to said cushion means, longitudinal rod means secured to said prong means and vertical slotted means adapted to contain the extremities of said rod means for restricting the movements of said cushion means.

40. In a chiropractic mechanism, the combination of a forward cushion adapted to support the upper abdomen of a human body, a rear cushion adapted to support the lower abdomen of a human body, independent slide means secured to each of said cushions, guide means adapted to guide said slide means, a strut means hinged to said guide means extending downward therefrom, a spring means tending to oscillate said strut means, degageable means adapted to restrain oscillation of said strut means, a rod means secured to said guide means and a slotted means adapted to contain the extremities of said rod means for restricting the movements of said guide means.

41. In a chiropractic mechanism, an abdomen cushion means, a leg means pivoted to one end of said cushion means extending downward therefrom, leg extension means adapted to meet said leg means in telescoping relation thereto, a spring means adapted to support said leg means, a spring means tending to oscillate said leg means, degageable means adapted to restrain oscillation of said leg means, ledge means adapted to support the other end of said cushion means, said ledge means comprising foldable sections of different heights for changing the supporting height of said ledge means, a prong means secured to said cushion means, rod means secured to said prong means and slotted means adapted to contain the extremities of said rod means for restricting the movements of said cushion means.

42. In a chiropractic mechanism the combination of a forward cushion adapted to support the upper abdomen of a human body, a rear cushion adapted to support the lower abdomen of a human body, independent slide means secured to each of said cushions, guide means adapted to guide said slide means, a leg means pivoted to said guide means extending downward therefrom, extension means adapted to meet said leg means in telescoping relation thereto, a spring means adapted to support said leg means, a spring means tending to oscillate said leg means, degageable means adapted to restrain oscillation of said leg means, a ledge means adapted to support one end of said guide means, said ledge means comprising foldable sections of different heights for changing the supporting height of said ledge means.

43. In a chiropractic mechanism, an abdomen cushion means, ledge means adapted to support one end of said cushion means, said ledge means comprising foldable sections of different heights for changing the supporting height of said ledge means, a strut means hinged to said cushion means extending downward therefrom to partly support said cushion means, spring means tending to oscillate said strut means and degageable means adapted to restrain oscillation of said strut means, a prong means secured to said cushion means, rod means secured to said prong means and slotted means adapted to contain the extremities of said rod means for restricting the movements of said cushion means.

44. In a chiropractic mechanism, an abdomen cushion means, a leg means pivoted to one end of said cushion means extending downward therefrom, extension means adapted to meet said leg means in telescoping relation thereto, a spring means adapted to support said leg means, a spring means tending to oscillate said leg means, degageable means adapted to restrain oscillation of said leg means, ledge means adapted to support the other end of said cushion means, said ledge means comprising foldable sections of different heights for changing the supporting height of said ledge means, a strut means hinged to said cushion means extending downward therefrom cooperating with said leg means in supporting said cushion means, spring means tending to oscillate said strut means and degageable means adapted to restrain oscillation of said strut means.

45. In a chiropractic mechanism the combination of an abdomen cushion means, slide means secured to said cushion means, guide means adapted to guide said slide means, leg means pivoted to one end of said guide means extending downward therefrom, leg extension means adapted to meet said leg means in telescoping relation thereto, a spring means adapted to support said leg means, a spring means tending to oscillate said leg means, degageable means adapted to restrain oscillation of said leg means, a strut means hinged to said cushion means extending downward therefrom, a spring means tending to oscillate said strut means from vertical position, and a degageable means adapted to restrain oscillation of said strut means.

46. In a chiropractic mechanism the combination of a forward cushion adapted to support the upper abdomen of a human body, a rear cushion adapted to support the lower abdomen of a human body, independent slide means secured to each of said cushion means, guide means adapted to guide said slide means, a leg means pivoted to said guide means extending downward therefrom, leg extension means adapted to meet said leg means in telescoping relation thereto, a spring means adapted to support said leg means, a spring means tending to oscillate said leg means, degageable means adapted to restrain oscillation of said leg means, a rod means secured to said guide means, slotted means adapted to contain the extremities of said rod means for restricting the movements of said guide means, a ledge means adapted to support one end of said guide means, said ledge means comprising foldable sections of different heights for changing the supporting height of said ledge means.

47. In a chiropractic mechanism, an abdomen cushion means, a leg means pivoted to one end of said cushion means extending downward therefrom, extension means adapted to meet said leg means in telescoping relation thereto, a spring means adapted to support said leg means, a spring means tending to oscillate said leg means, degageable means adapted to restrain oscillation of said leg means, ledge means adapted to support the other end of said cushion means, said ledge means comprising foldable sections of different heights for changing the supporting height of said ledge means, a strut means hinged to said cushion means extending downward therefrom cooperating with said leg means in supporting said cushion means, a spring means tending to oscillate said strut means, a degageable means adapted to restrain oscillation of said strut means, a prong means secured to said cushion means, rod means secured to said prong means and slotted means adapted to contain the extremities of said rod means for restricting the movements of said cushion means.

48. In a chiropractic mechanism, an abdomen cushion means, slide means secured to said cushion means, guide means adapted to guide said slide means, a leg means pivoted to one end of said guide means extending downward therefrom, extension means adapted to meet said leg means in telescoping relation thereto, a spring means adapted to support said leg means, a spring means tending to oscillate said leg means, degageable means adapted to restrain oscillation of said leg means, a rod means secured to said guide means, slotted means adapted to surround the extremities of said rod means to restrict the movements of said guide means, a strut means hinged to said cushion means extending downward therefrom, a spring means tending to oscillate said strut means from vertical position, and a degageable means adapted to restrain oscillation of said strut means 49. In a chiropractic mechanism a forward cushion means adapted to support the upper abdomen of a human body, a rear cushion means adapted to support the lower abdomen of a human body, independent slide means secured to each of said cushion means, guide means adapted to guide said slide means, a strut means hinged to one end of said guide means extending downward therefrom, a spring means tending to oscillate said strut means, a degageable means adapted to restrain oscillation of said strut means, rod means secured to the other end of said guide means, slotted means adapted to surround the extremities of said rod means for restricting the movements of said guide means and a ledge means adapted to support said other end of said guide means comprising foldable sections of different heights for changing the supporting height of said ledge means.

50. In a chiropractic mechanism the combination of an abdomen cushion means, slide means secured to said cushion means, guide means adapted to guide said slide means, leg means pivoted to one end of said guide means extending downward therefrom, extension means adapted to meet said leg means in telescoping relation thereto, a spring means adapted to support said leg means, a spring means tending to oscillate said leg means, degageable means adapted to restrain oscillation of said leg means, a ledge means adapted to support the other end of said guide means said ledge means comprising foldable sections of different heights for changing the supporting height of said ledge means, a strut means hinged to said cushion means extending downward therefrom, a spring means tending to oscillate said strut means and a degageable means adapted to restrain oscillation of said strut means.

51. In a chiropractic mechanism a forward cushion means adapted to support the upper abdomen of a human body, a rear cushion means adapted to support the lower abdomen of a human body, independent slide means secured to each of said cushion means, guide means adapted to guide said slide means, a leg means pivoted to said guide means extending from one end thereof, extension means adapted to meet said leg means in telescoping relation thereto, a spring means adapted to support said leg means, a spring means tending to oscillate said leg means, degageable means adapted to restrain oscillation of said leg means, rod means secured to the other end of said guide means, slotted means adapted to surround the extremities of said rod means for restricting the movements of said guide means, a strut means hinged to said guide means extending downward therefrom, adapted to partly support said guide means, a spring means tending to oscillate said strut means and degageable means adapted to restrain oscillation of said strut means, and a ledge means adapted to support said other end of said guide means comprising foldable sections of different heights for changing the supporting height of said ledge means.

52. In a chiropractic mechanism, thigh and knee cushion means, tiltable means adapted to support said cushion means, leg means pivoted to said tiltable means extending downward therefrom, notched means arranged on said leg means in descending order, a fixed rod means adapted to selectively engage said notches for changing the position of said cushion means and a spring means acting normally to oscillate said notches in engagement with said rod means.

53. In a chiropractic mechanism the combination of a head cushion means comprising cooperatable cushions, independent slide means secured to each of said cushions, guide means adapted to guide said slide means, slide means secured to said guide means transversely to the first mentioned slide means and guide means adapted to guide the second mentioned slide means, cooperatable chest cushions, hinges adapted to support the outer edges of said chest cushions and a screw means disposed under the interception of said cushions in nosed relation thereto for changing the angularity thereof.

54. In a chiropractic mechanism, the combination of a head cushion means comprising cooperatable cushions, independent slide means secured to each of said cushions, guide means adapted to guide said slide means, slide means secured to said guide means transversely to the first mentioned slide means and guide means adapted to guide the second mentioned slide means, a thigh cushion means, a knee cushion means adjacent said thigh cushion means, independent slide means secured to each of said thigh and knee cushion means transversely to the interception thereof and guide means adapted to guide the last two mentioned slide means.

55. In a chiropractic mechanism, the combination of a forward cushion adapted to support the upper abdomen of a human body, a rear cushion adapted to support the lower abdomen of a human body, independent slide means secured to each of said forward and rear cushions transversely to the interception thereof, guide means adapted to guide said slide means, a thigh cushion means, a knee cushion means adjacent said thigh cushion means, independent slide means secured to each of said thigh and knee cushion means transversely to the interception thereof and guide means adapted to guide the last two mentioned slide means.

56. In a chiropractic mechanism, the combination of cooperatable chest cushions, hinges adapted to support the outer edges of said chest cushions, a screw means disposed under the interception of said cushions in nosed relation thereto for changing the angularity thereof, a forward cushion adapted to support the upper abdomen of a human body, a rear cushion adapted to support the lower abdomen of a human body, independent slide means secured to each of said forward and rear cushions transversely to the interception thereof, and guide means adapted to guide said slide means.

57. In a chiropractic mechanism, the combination of cooperatable chest cushions, hinges adapted to support the outer edges of said chest cushions, a screw means disposed under the interception of said cushions in nosed relation thereto for changing the angularity thereof, a thigh cushion means, a knee cushion means adjacent said thigh cushion means, independent slide means secured to each of said thigh and knee cushion means transversely to the interception thereof and guide means adapted to guide said slide means.

58. In a chiropractic mechanism, the combination of cooperatable chest cushions, hinges adapted to support the outer edges of said chest cushions, a screw means disposed under the interception of said cushions in nosed relation thereto for changing the angularity thereof, a forward cushion adapted to support the upper abdomen of a human body, a rear cushion adapted to support the lower abdomen of a human body, independent slide means secured to each of said forward and rear cushions transversely to the interception thereof, guide means adapted to guide said slide means, a thigh cushion means, a knee cushion means adjacent to said thigh cushion means, independent slide means secured to each of said thigh and knee cushion means, transversely to the interception thereof and guide means adapted to guide the last two mentioned slide means.

59. In a chiropractic mechanism, the combination of a head cushion means comprising cooperatable cushions, independent slide means secured to each of said cushions, guide means adapted to guide said slide means, slide means secured to said guide means transversely to the first mentioned slide means, guide means adapted to guide the second mentioned slide means, a forward cushion adapted to support the upper abdomen of a human body, a rear cushion adapted to support the lower abdomen of a human body, independent slide means secured to each of said forward and rear cushions transversely to the interception thereof, guide means adapted to guide the last two mentioned slide means, a thigh cushion means, a knee cushion means adjacent to said thigh cushion means, independent slide means secured to each of said thigh and knee cushion means, transversely to the interception thereof and guide means adapted to guide the last two mentioned slide means.

60. In a chiropractic mechanism, the combination of a head cushion means comprising cooperatable cushions, independent slide means secured to each of said cushions, guide means adapted to guide said slide means, slide means secured to said guide means transversely to the first mentioned slide means, guide means adapted to guide the second mentioned slide means, cooperatable chest cushions, hinges adapted to support the outer edges of said chest cushions, a screw means disposed under the interception of said cushions in nosed relation thereto for changing the angularity thereof, a thigh cushion means, a knee cushion means adjacent to said thigh cushion means, independent slide means secured to each of said thigh and knee cushion means, transversely to the interception thereof and guide means adapted to guide the last two mentioned slide means.

61. In a chiropractic mechanism, the combination of a head cushion means comprising cooperatable cushions, independent slide means secured to each of said cushions, guide means adapted to guide said slide means, slide means secured to said guide means transversely to the first mentioned slide means, guide means adapted to guide the second mentioned slide means, cooperatable chest cushions, hinges adapted to support the outer edges of said chest cushions, a screw means disposed under the interception of said cushions in nosed relation thereto for changing the angularity thereof, a forward cushion adapted to support the upper abdomen of a human body, a rear cushion adapted to support the lower abdomen of a human body, independent slide means secured to each of said forward and rear cushions transversely to the interception thereof, and guide means adapted to guide the last two mentioned slide means.

62. In a chiropractic mechanism, the combination of a head cushion means comprising cooperatable cushions, independent slide means secured to each of said cushions, guide means adapted to guide said slide means, slide means secured to said guide means transversely to the first mentioned slide means and guide means adapted to guide the second mentioned slide means, cooperatable chest cushions, hinges adapted to support the outer edges of said chest cushions, a screw means disposed under the interception of said cushions in nosed relation thereto for changing the angularity thereof, a forward cushion adapted to support the upper abdomen of a human body, a rear cushion adapted to support the lower abdomen of a human body, independent slide means secured to each of said forward and rear cushions transversely to the interception thereof, guide means adapted to guide the last two mentioned slide means, a thigh cushion means, a knee cushion means adjacent to said thigh cushion means, independent slide means secured to each of said thigh and knee cushion means, transversely to the interception thereof and guide means adapted to guide the last two mentioned slide means.

In testimony whereof, I have hereunto set my hand on this the 30th day of April, 1923. A. D.

LUTHER L. CASTETTER.